N. P. INGALLS.
PROPELLING BOATS, &c.

No. 180,884. Patented Aug. 8, 1876.

Witnesses:
Michael Ryan
Fred Haynes

N. P. Ingalls
By his Attorneys
Brown & Allen

UNITED STATES PATENT OFFICE.

NATHANIEL P. INGALLS, OF ST. PAUL, MINNESOTA.

IMPROVEMENT IN PROPELLING BOATS, &c.

Specification forming part of Letters Patent No. 180,884, dated August 8, 1876; application filed January 26, 1876.

*To all whom it may concern:*

Be it known that I, NATHANIEL P. INGALLS, of St. Paul, in the county of Ramsey and State of Minnesota, have invented an Improvement in Propellers; and I do hereby declare that the following is a full, clear, and exact description of the same.

This invention relates to an apparatus for propelling boats, barges, scows, and other similar vessels; and the invention consists of a novel construction and combination of parts, which will be fully hereinafter described, and specifically pointed out in the claim, the object being to obtain cheapness and simplicity of construction and efficiency of operation.

In carrying out my invention I attach the working parts of the apparatus to a frame, which may be readily secured to a vessel of any suitable construction. In this frame are journaled two shafts, carrying gear-wheels driven by a gearing from the main driving-shaft. Both ends of each of these shafts carry cranks, to which blocks or plates are secured in such a manner as to revolve with a parallel motion around the axes of said shafts when the cranks are turned. The paddles are attached to the lower ends of shanks or stocks, which are secured to the blocks or plates in such a manner as to enable them to be adjusted up or down, according to the height of the carrying-frame above the surface of the water. The driving-shaft may be operated directly from the pitman or piston rod of an engine, or may be driven by an endless chain or belt.

Figure 1:
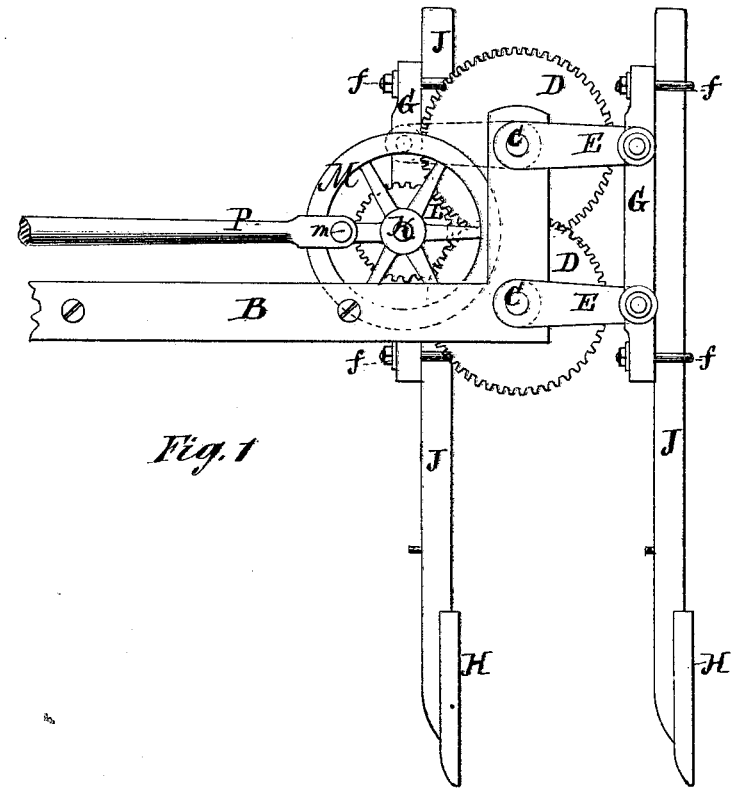
Figure 2:
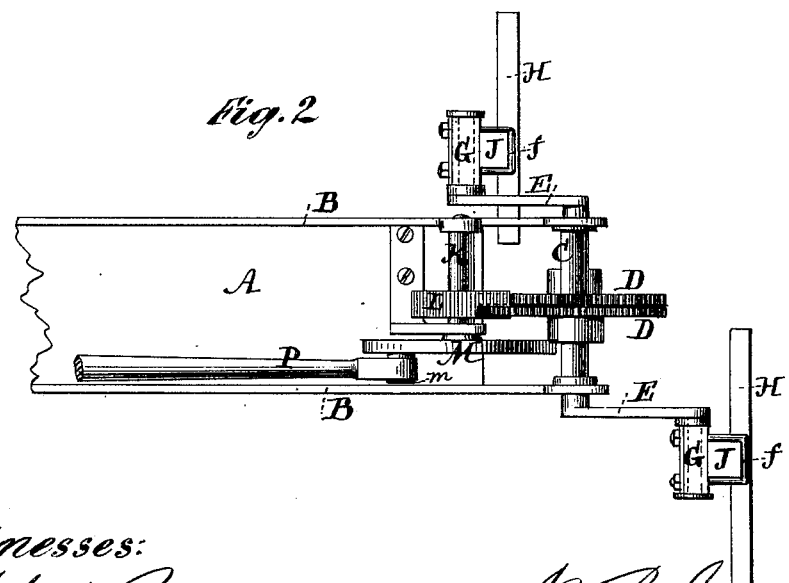

The accompanying drawing represents an apparatus constructed according to my invention, Figure 1 being a side elevation, and Fig. 2 a top view, of the same.

The carrying-frame, supporting the propelling apparatus, may be of any suitable construction. It is here shown as consisting of a beam, A, provided with two side plates or arms, B B, on two opposite sides, running parallel with its length, and then turned upward at one end for a suitable distance. In these plates or arms are bearings for two shafts, C C, arranged one above the other, and each carrying a toothed wheel, D, about midway of its length. At each end of each shaft C, outside of the frame-work, is a crank, E, the two cranks on one side of the frame being parallel with each other, and the two on the opposite side being also parallel with each other, but extending in an opposite direction from the first two, or at any desired angle with relation thereto. To the wrist-pins of each pair of cranks a paddle-holder, consisting of a block, plate, or bar, G, is attached in such a manner as to allow it to revolve with a parallel motion when the shafts C C are rotated, and to always maintain a vertical position. The paddles H may be of any suitable form and dimensions. Each paddle is secured to the lower end of a shank or stock, J, and this stock is secured to the block or plate G by means of keepers or staples $f$, provided with nuts and screw-threads for tightening them. The stocks J may be raised or lowered in the keepers $f$, in order to adjust the paddles in accordance with the height of the apparatus above the surface of the water, or to enable said paddles to enter the water to a greater or less depth. In the carrying-frame, forward of the two shafts C C, are bearings for a shaft, K, which carries a toothed wheel, L, so arranged as to gear with the two wheels D D simultaneously, and rotate them both in the same direction at the same time. The shaft K may be driven by a crank or by a pulley and belt or endless chain, or in any other suitable manner. It is here shown as provided with a crank-wheel, M, to the wrist-pin $m$ of which is connected the outer end of a piston-rod, P, of an engine, or a pitman connecting with a piston-rod.

The apparatus, constructed as described, is bolted or fastened in any suitable manner to the stern of the boat, barge, scow, or other vessel to be propelled, and may be driven by an engine placed slightly forward of it. When desired, it may be readily removed from one vessel to another. I prefer to use a small engine, and to make the wheel L smaller than the wheels D D, as I am thereby enabled to get the required speed with a small expenditure of power, and also to change the apparatus from one vessel to another when desired.

As the shafts C C revolve, the cranks E carry the blocks or plates G around with a parallel motion, so that they and the paddles carried thereby always maintain a vertical position, by which means I obtain the desired advantages resulting from the vertical position of the paddles when entering, passing through, and leaving the water.

By the combination and arrangement of parts herein described, I obtain a propelling apparatus which is cheap and simple in its construction and economical and efficient in its operation, and which may be readily applied to vessels of various descriptions, and as readily changed from one vessel to another, without the necessity for altering the construction of the vessel or the apparatus.

What I claim as new, and desire to secure by Letters Patent, is—

The combination of the carrying-frame B, driving gear-wheels L D D, operated by the crank P, the cranks E F, holder G, and adjustable paddle-stocks J, substantially as herein described.

NATHANIEL P. INGALLS.

Witnesses:
 ALBERT ARMSTRONG,
 JAS. O'BRIEN.